United States Patent
Mahloo et al.

(10) Patent No.: US 11,687,451 B2
(45) Date of Patent: Jun. 27, 2023

(54) MEMORY ALLOCATION MANAGER AND METHOD PERFORMED THEREBY FOR MANAGING MEMORY ALLOCATION

(71) Applicant: Telefonaktiebolaget LM Ericsson (publ), Stockholm (SE)

(72) Inventors: Mozhgan Mahloo, Solna (SE); Amir Roozbeh, Kista (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/493,137

(22) PCT Filed: Mar. 23, 2017

(86) PCT No.: PCT/SE2017/050280
§ 371 (c)(1),
(2) Date: Sep. 11, 2019

(87) PCT Pub. No.: WO2018/174758
PCT Pub. Date: Sep. 27, 2018

(65) Prior Publication Data
US 2020/0117596 A1    Apr. 16, 2020

(51) Int. Cl.
   G06F 12/02    (2006.01)
   G06F 9/50     (2006.01)
   G06F 12/06    (2006.01)

(52) U.S. Cl.
   CPC .. *G06F 12/0646* (2013.01); *G06F 2212/1044* (2013.01)

(58) Field of Classification Search
   CPC .......... G06F 9/50; G06F 9/5016; G06F 9/544; G06F 2009/45583; G06F 12/02;
   (Continued)

(56) References Cited

U.S. PATENT DOCUMENTS 7,650,331 B1    1/2010 Dean et al.
9,535,757 B2 *  1/2017 Suzuki ................. G06F 9/5038
(Continued)

FOREIGN PATENT DOCUMENTS

WO    2016 122675 A1    8/2016

OTHER PUBLICATIONS

Data Center Agility at Scale, delivered by Intel's industry-leading ecosystem; Intel Rack Scale Design (Intel RSD); http://www.intel.com/content/www/us/en/architecture-and-technology/intel-rack-scale-architecture.html—downloaded on Sep. 16, 2019.
(Continued)

*Primary Examiner* — Ilwoo Park
(74) *Attorney, Agent, or Firm* — Baker Botts L.L.P.

(57) ABSTRACT

A memory allocation manager and a method performed thereby for managing memory allocation, within a data centre, to an application are provided. The data centre comprises at least a Central Processing Unit, CPU, pool and at least one memory pool. The method comprises receiving (210) information associated with a plurality of instances associated with an application to be initiated, wherein individual instances are associated with individual memory requirements, the information further comprising information about an internal relationship between the instances; and determining (230) for a plurality of instances, a minimum number of memory blocks and associated sizes required based on the received information, by identifying parts of memory blocks and associated sizes that may be shared by two or more instances based on their individual memory requirements and/or the internal relationship between the instances. The method also comprises allocating (240) a number of memory blocks to the instances of the application based on the determined minimum number of memory blocks.

17 Claims, 9 Drawing Sheets

(58) Field of Classification Search
CPC .............. G06F 12/0223; G06F 12/023; G06F 12/0284; G06F 12/0646; G06F 12/0806; G06F 12/0871; G06F 15/16; G06F 15/161; G06F 15/163; G06F 15/167; G06F 15/17331; G06F 2212/1041; G06F 2212/1044; G06F 2212/6042
USPC ......... 711/147–153, 130; 718/104, 100, 106; 719/312
See application file for complete search history.

(56) References Cited

U.S. PATENT DOCUMENTS

| | | | | |
|---|---|---|---|---|
| 10,073,874 | B1* | 9/2018 | Sivathanu | G06F 11/1402 |
| 10,402,227 | B1* | 9/2019 | Kinney, Jr. | G06F 9/5011 |
| 2008/0301708 | A1* | 12/2008 | Hamilton | G06F 13/4027 |
| | | | | 719/314 |
| 2013/0254576 | A1* | 9/2013 | Kodaka | G06F 1/3228 |
| | | | | 713/324 |
| 2014/0068621 | A1 | 3/2014 | Sitaraman et al. | |
| 2014/0289739 | A1* | 9/2014 | Bodzsar | G06F 9/544 |
| | | | | 719/312 |
| 2015/0134930 | A1 | 5/2015 | Huang et al. | |
| 2015/0227394 | A1 | 8/2015 | Chin et al. | |
| 2019/0303200 | A1* | 10/2019 | Sitaraman | G06F 9/505 |

OTHER PUBLICATIONS

PCT International Search Report for International application No. PCT/SE2017/050280—dated Sep. 21, 2017.

System-Level Implications of Disaggregated Memory, High Performance Computer Architecture (HPCA) by Kevin Lim et al.—IEEE 2011.

PCT Written Opinion of the International Searching Authority for International application No. PCT/SE2017/050280—dated Sep. 21, 2017.

Chinese Office Action issued for Application No. 201780088590—dated Mar. 24, 2023.

\* cited by examiner

| Process | Memory Operation | Memory block size | CPU cores |
|---|---|---|---|
| Mapper 1 | Write | M1 | 1 |
| Mapper 2 | Write | M2 | 1 |
| Mapper n | Write | Mn | 1 |
| Reducer n+1 | Read | M1+M2+ ...+Mn | 1 |
| Reducer n+2 | Read | M1+M2+ ...+Mn | 1 |
| Reducer n+m | Read | M1+M2+ ...+Mn | 1 |

Table 1: Example of request coming from application

| Memory block | Memory Operation | Memory block size |
|---|---|---|
| Block 1 | Write | M1 |
| Block 2 | Write | M2 |
| Block n | Write | Mn |
| Block n+1 | Read | M1+M2+ ...+Mn |

Fig. 3c

| Memory block | Start-End memory address |
|---|---|
| Block 1 | 100-200 |
| Block 2 | 200-300 |
| Block n | (n -1) × 100 -- n × 100 |

Fig. 3d

| Process | Memory Operation | Memory block adresses | CPU cores |
|---|---|---|---|
| Mapper 1 | Write | 100-200 | 1 |
| Mapper 2 | Write | 200-300 | 1 |
| Mapper n | Write | (n -1) × 100 -- n × 100 | 1 |
| Reducer n+1 | Read | 100- n × 100 | 1 |
| Reducer n+2 | Read | 100- n × 100 | 1 |
| Reducer n+m | Read | 100- n × 100 | 1 |

Fig. 3e

MEMORY ALLOCATION MANAGER AND METHOD PERFORMED THEREBY FOR MANAGING MEMORY ALLOCATION

PRIORITY

This nonprovisional application is a U.S. Nation& Stage Filing under 35 U.S.C. § 371 of International Patent Application Serial No, PCT/SE2017/050280 filed Mar. 23, 2017 and entitled "A MEMORY ALLOCATION MANAGER AND METHOD PERFORMED THEREBY FOR MANAGING MEMORY ALLOCATION" which is hereby incorporated by reference in its entirety.

TECHNICAL FIELD

The present disclosure relates to data centres and in particular to managing memory allocation within a data centre.

BACKGROUND

Distributed computing may be translated as a system using multiple servers or processors to solve a problem. Distributed computing accomplishes a job by dividing the problem/job into many sub-problems each allocated to distinct processors within a cluster of computing resources. Distributed and parallel processing is shown to be one of the most efficient methods for processing/querying large-scale data sets. Lots of the steps in large scale data processing are done on the datasets shared among more than one processing unit. In many cases, the same data or a subset of that shared dataset is loaded and kept locally in servers in distributed and parallel processing systems. Map-reduce programming is an example of such system where the intermediate datasets produced by the Map operations are shared among at least two distinct Reducer modules/processes. Map-reduce is a well-known model for processing large amount of data using heterogeneous parallel systems in a distributed manner.

Such applications comprise a set of processes/instances operating on same content saved in distributed or shared disks, and loaded to each process local memory for operation (see FIG. 1b). Large amount of intermediate data is produced and consumed by several instances to complete special tasks. Some of the instances write/generate the data, which is going to be used by the rest of instances which only read the same data.

In conventional data centres/computer systems with the large amounts of distributed servers, typically the generated content is saved locally in the storage tier, and will be copied through the networking layer to the local storage and then memory of the consumer instance which read the data to complete the tasks. This means the same content will be copied as many as the available instances that need to read the data.

In the cases that shared storage is used for shared data sets, the intermediate data needs to be flushed from producer (write) instance cash/memory to the shared storage, which is locally located on one or more of the servers in the network and consumer (read) instances need to fetch a copy of data in their local cash/memory to perform on them.

With the introduction of new architecture design within the data centres namely as "disaggregated architecture", the way current applications are working might change drastically and they may achieve much better performance with same or even less amount of hardware. Disaggregated architecture comprises several pools of componnets such as one or more pools of CPUs, one or more pools of memories, one or more pools of storage nodes as well as one or more pools of NICs (Network Interface Cards) connecting through a very fast interconnect (see FIG. 1a). This means that distinct and pre-configured servers as they are today, may more or less disappear in future data centre architectures. In return, logical servers may be created dynamically and on-demand by combining a subset of available pools of hardware in the data centre, or even within several geographically distinct data centres.

The existing solutions for storing and retrieving intermediate data (shared datasets) suffers the limitations of the hardware design of conventional data centres and use lots of unnecessary resources. The same contents are duplicated so many times and can be found in several nodes within the data centre for each job. For example, D1 in FIG. 1b, will be written once from the cash of instance 1 to its local memory, and then to the storage. Then it will be retrieved in the local memory/cash of several consumer instances (such as instance 4) that are using this set of data. Moreover, this transaction will consume lots of I/O and network bandwidth for sending the same data to all the instances that are going to use that data. This might limit the speed of the job processing as well as consuming too much unnecessary networking bandwidth and memory volumes, which may lead to congestion in some part of the interconnection between pools or servers. Another important issue is the delay caused by several levels of memory transactions as well as retrieving data from storage nodes that are slow in comparison with RAM. The networking in between also adds more to this delay.

Therefore, available solutions are suitable/matched for architectures with separate physical/virtual servers communicating through a network each have their CPU and local cash/memory. The servers might also have a local storage of any type, or be connected to several external storage nodes residing in an internal or external network. These approaches are sub-optimal for the new data centre hardware architectures arising, i.e. disaggregated hardware type of architectures. The disaggregation enables more efficient implementation of such application to achieve better performance.

SUMMARY

The object is to obviate at least some of the problems outlined above. In particular, it is an object to provide a memory allocation manager and a method performed by a memory allocation manager for managing memory allocation, within a data centre, to an application. These objects and others may be obtained by providing a memory allocation manager and a method performed by a memory allocation manager according to the independent claims attached below.

According to an aspect, a method performed by a memory allocation manager for managing memory allocation, within a data centre, to an application is provided. The data centre comprises at least a Central Processing Unit, CPU, pool and at least one memory pool. The method comprises receiving information associated with a plurality of instances associated with an application to be initiated, wherein individual instances are associated with individual memory requirements, the information further comprising information about an internal relationship between the instances; and determining for a plurality of instances, a minimum number of memory blocks and associated sizes required based on the received information, by identifying parts of memory blocks and associated sizes that may be shared by two or more instances based on their individual memory requirements and/or the internal relationship between the instances. The method also comprises allocating a number of memory blocks to the instances of the application based on the determined minimum number of memory blocks.

According to an aspect, a memory allocation manager for managing memory allocation, within a data centre, to an application is provided. The data centre comprises at least a Central Processing Unit, CPU, pool and at least one memory pool. The memory allocation manager is configured for receiving information associated with a plurality of instances associated with an application to be initiated, wherein individual instances are associated with individual memory requirements, the information further comprising information about an internal relationship between the instances; and determining for a plurality of instances, a minimum number of memory blocks and associated sizes required based on the received information, by identifying parts of memory blocks and associated sizes that may be shared by two or more instances based on their individual memory requirements and/or the internal relationship between the instances. The memory allocation manager is also configured for allocating a number of memory blocks to the instances of the application based on the determined minimum number of memory blocks.

The method performed by the memory allocation manager and the memory allocation manager have several advantages. One possible advantage is that the use of memory resources in new data centre environments may be reduced by creating less copy of the same data. Another possible advantage is that networking transactions may be reduced, which leads to less traffic on the inter-/intra-data centre networks. Yet a possible advantage is that latency may be reduced by accessing data directly from shared RAM instead of retrieving it from storage node reside somewhere in the network with limited speed and capacity. Still a possible advantage is that job performance may be improved and the job execution time may be speeded up, meaning that more tasks may be executed with less amounts of resources and in shorter time.

BRIEF DESCRIPTION OF DRAWINGS

Embodiments will now be described in more detail in relation to the accompanying drawings, in which:

FIG. 3c shows Table 2 of the example.

FIG. 3d shows Table 3 of the example.

FIG. 3e shows Table 4 of the example.

DETAILED DESCRIPTION

Briefly described, a method performed by a memory allocation manager and a memory allocation manager are provided for managing memory allocation, within a data centre, to an application. The memory allocation manager may allocate a shared part of memory which is seen as the local memory for each of the instances that are accessing it, to place shared datasets which is going to be used among many instances or even CPUs (physical/virtual) in a distributed and parallel computing system/application.

The memory allocation manager makes use of information about an application to be initiated, about individual instances associated with the application and an internal relationship between the instances. The memory allocation manager may identify which instances will share which memories and perform the allocation of memory to instances based at least partly on such information.

Embodiments herein relate to a method performed by a memory allocation manager for managing memory allocation, within a data centre, to an application. The data centre comprises at least a Central Processing Unit, CPU, pool and at least one memory pool. Embodiments of such a method will now be described with reference to FIGS. 2a and 2b.

Figure 2A:
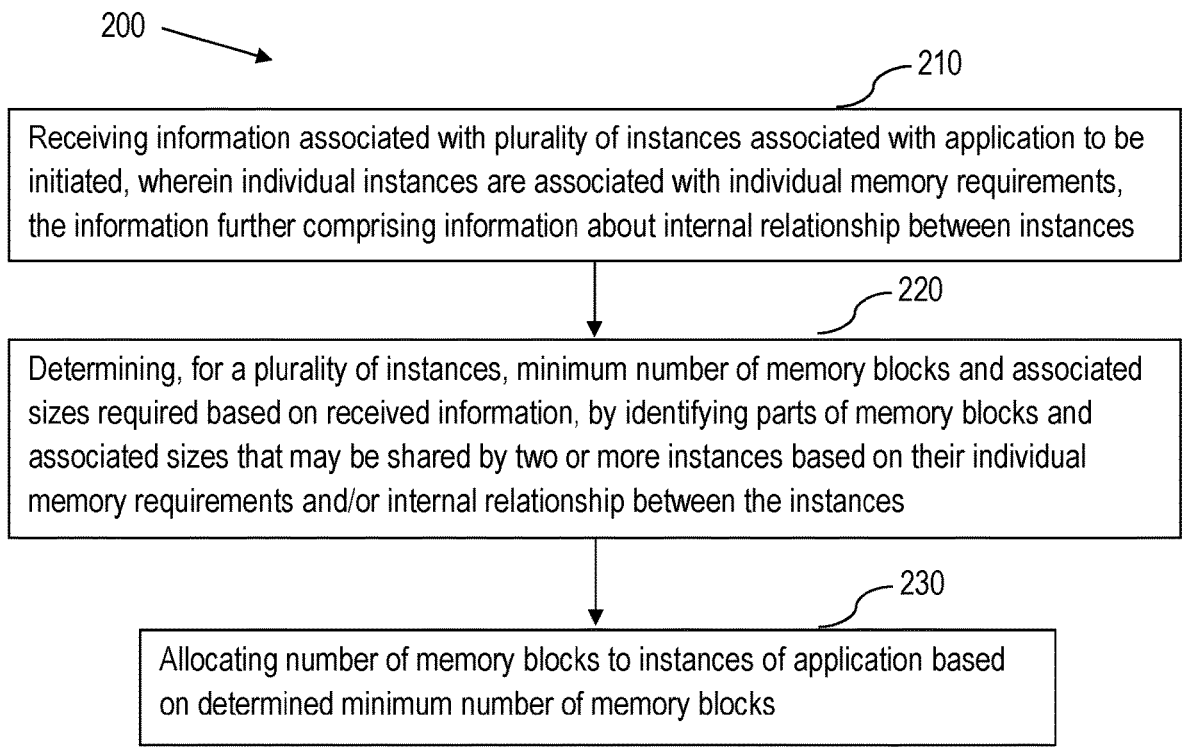
FIG. 2a is a flowchart of a method performed by a memory allocation manager for managing memory allocation, according to an exemplifying embodiment.

FIG. 2a illustrates the method comprising receiving 210 information associated with a plurality of instances associated with an application to be initiated, wherein individual instances are associated with individual memory requirements, the information further comprising information about an internal relationship between the instances; and determining 230 for a plurality of instances, a minimum number of memory blocks and associated sizes required based on the received information, by identifying parts of memory blocks and associated sizes that may be shared by two or more instances based on their individual memory requirements and/or the internal relationship between the instances. The method also comprises allocating 240 a number of memory blocks to the instances of the application based on the determined minimum number of memory blocks.

Figure 1A:
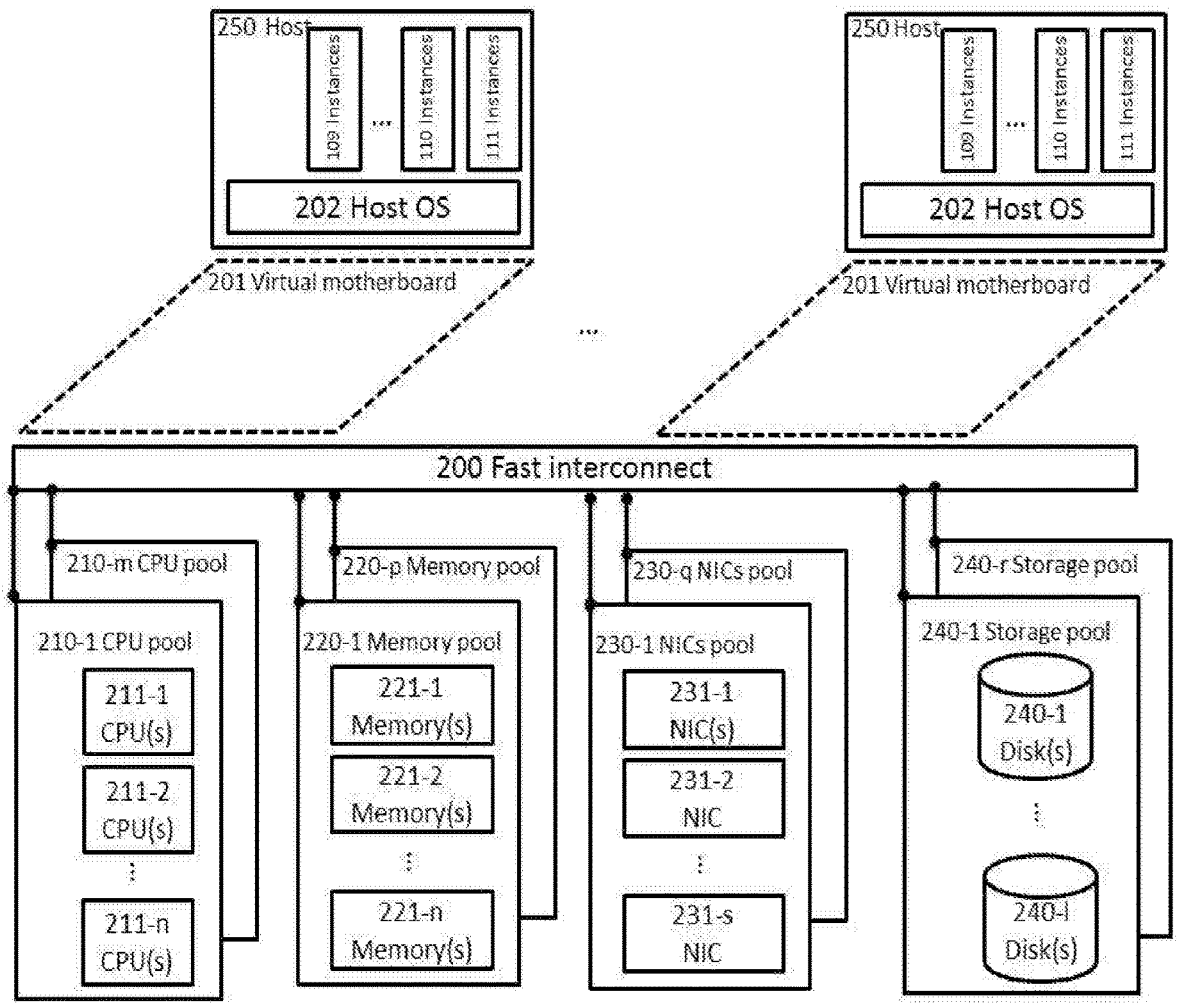
FIG. 1a is a schematic illustration of a data centre according to a disaggregated hardware architecture.
Figure 1B:
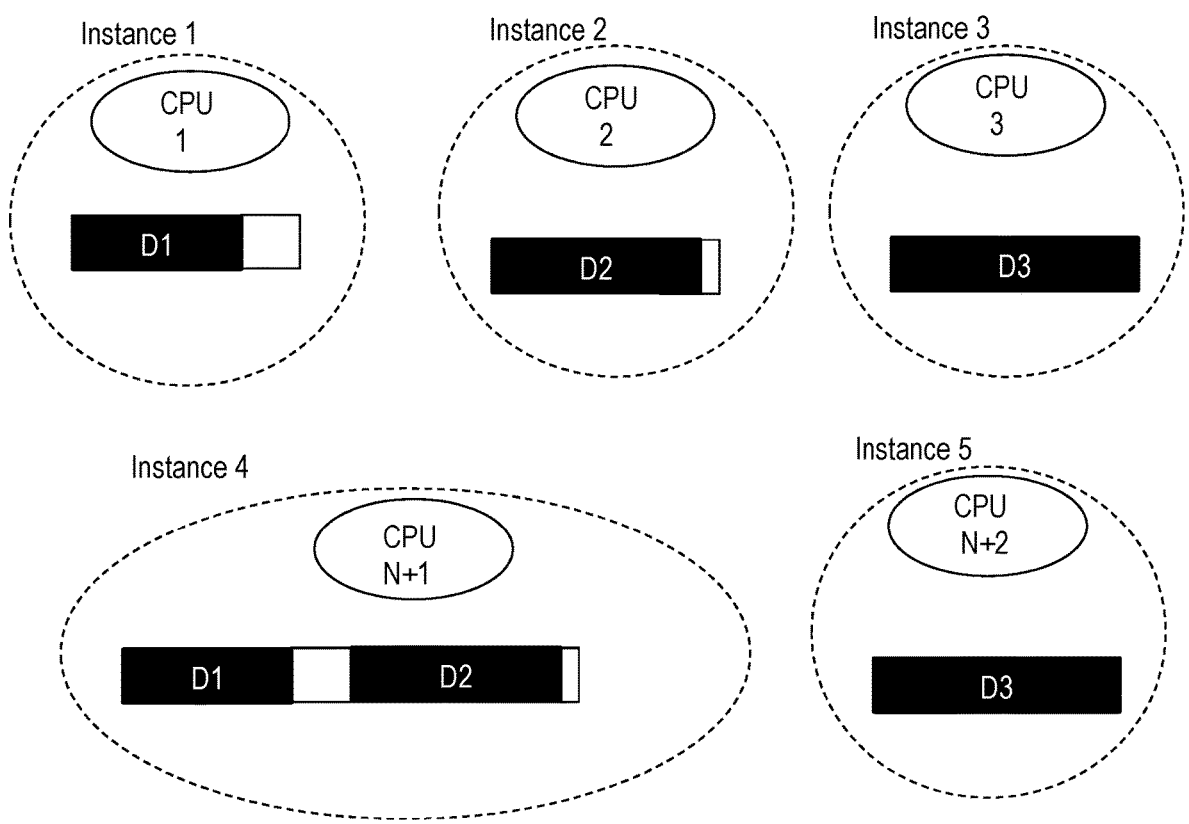
FIG. 1b is an illustration of instances of an application operating on the same content.

The data centre may comprise a plurality of different pools as illustrated in FIG. 1a. An instance, host or logical server is assigned, or comprises, the at least memory resources and CPU resources from respective one or more memory pools and one or more CPU pools. The amount of allocated resources, e.g. memory resources, and their characteristics is defined based on the instance requirements, i.e. the instances belonging to an application. The memory requirements may be individual for different instances associated with the application meaning that individual instances (and thus applications) may require different amounts of memory, different types of memory and/or different ratios of different types and sizes of memories.

The memory allocation manager receives 210 information associated with a plurality of instances associated with an application to be initiated, wherein individual instances are associated with individual memory requirements, the information further comprising information about an internal relationship between the instances.

The instances have an internal relationship. In a non-limiting, illustrative and simplified example, instance A may write information to a piece of memory which is to be read by instances C and E; and instance B may write information on another piece of memory which is to be read by instances A, C and D. This means that one or more instances may read and make use of data stored/written by one or more other instances. By receiving information about the internal relationship between the instances, the memory allocation manager gets an overview of e.g. which instances require separate pieces of memory to write/store data and which instances require to read/use data in which pieces of memory.

The memory allocation manager may then use this information to determine 220 for a plurality of instances, a minimum number of memory blocks and associated sizes required by identifying parts of memory blocks and associated sizes that may be shared by two or more instances based on their individual memory requirements and/or the internal relationship between the instances. Reverting to the non-limiting, illustrative and simplified example above, instances A and B require a certain amount of memory to write/store data in, whereas instances C, D and E only need to be able to access the data written/stored in the memory parts associated with instances A and B. The minimum number of memory blocks and associated sizes are thus dependent on the required amount of memory to write/store data in for instances A and B. The part of memory associated with instance A may thus be shared with instances A and E, and the part of memory associated with instance B may be shared with instances A, C and D. Consequently, the memory allocation manager identifies parts of memory blocks and associated sizes that may be shared by two or more instances based on their individual memory requirements and/or the internal relationship between the instances. Continuing with the non-limiting, illustrative and simplified example above, the memory allocation manager may e.g. determine that in total two memory blocks is needed, one for instance A to write (same block for C and E to read) and one block for instance B to write (shared with C and D).

The memory allocation manager may then allocate 230 a number of memory blocks to the instances of the application based on the determined minimum number of memory blocks. Continuing with the non-limiting, illustrative and simplified example above, the memory allocation manager may thus allocate 2 memory blocks to the instances A, B, C, D and E.

The method performed by the memory allocation manager has several advantages. One possible advantage is that the use of memory resources in new data centre environments may be reduced by creating less copy of the same data. Another possible advantage is that networking transactions may be reduced, which leads to less traffic on the inter-/intra-data centre networks. Yet a possible advantage is that latency may be reduced by accessing data directly from shared RAM instead of retrieving it from storage node reside somewhere in the network with limited speed and capacity. Still a possible advantage is that job performance may be improved and the job execution time may be speeded up, meaning that more tasks may be executed with less amounts of resources and in shorter time.

The received information associated with a plurality of instances may further comprise information about type of application, wherein the determining 220 of the required minimum number of memory blocks and associated sizes may further be based on the known relation between instances for that type of application.

Different applications may comprise different instances different requirements on types and sizes of memories. By knowing the type of application, the memory allocation manager may make use of knowledge about the application and the relationship between the instances in order to determine the required minimum number of memory blocks and associated sizes.

Merely as a non-limiting, simplified and illustrative example, "application 1" be associated with 8 instances each requiring x MBytes of writable memory, whereof 8 memory block of size x is needed to be allocated to write/store related data and thirteen instances are requiring to read and use all data written by those 8 instances, meaning that each needs at least 8x of memory size. This is an example of how the memory allocation manager may obtain the information associated with a plurality of instances associated with an application to be initiated, wherein individual instances are associated with individual memory requirements, the information further comprising information about an internal relationship between the instances. Thus receiving 210 information associated with a plurality of instances associated with an application to be initiated may comprise receiving information about type of application.

In another example, reverting to the non-limiting, simplified and illustrative example above, the "application 1" may have a basic version and alternative versions. This may then mean that the basic version is the one given above and that the information associated with a plurality of instances associated with an application to be initiated, wherein individual instances are associated with individual memory requirements, the information further comprising information about an internal relationship between the instances further informs the memory allocation manger about the version of the "application 1".

The memory allocation manager may thus combine the received information associated with a plurality of instances associated with an application to be initiated, wherein individual instances are associated with individual memory requirements, the information further comprising information about an internal relationship between the instances and the information about the type of application in order to determine 220 of the required minimum number of memory blocks and associated sizes may further be based on the known relation between instances for that type of application.

The determining 220 of the required minimum number of memory blocks and associated sizes may further be based on previous knowledge about the application.

There may be different factors that play a role in determining the minimum number of memory blocks and associated sizes. As described above, different applications may comprise different instances and thus also require different types and sizes of memories allocated to the application.

The memory allocation manager may have allocated memory blocks to the same application at a previous point in time and may thus have previous knowledge about the application and thus its instances. The memory allocation manager may thus make use of such information when determining the required minimum number of memory blocks and associated sizes for the application.

The allocating 230 of required memory to the instances of the application may comprise informing the determined required minimum number of memory blocks and related sizes to a Memory Management Controller, MMC, and receiving an allocation of memory blocks with addresses among at least a pool of memory units to the required minimum number of memory blocks.

The MMC may be responsible for actually performing the allocation of memory blocks to instances and handling performance of the memory pools. The memory allocation manager may directly or indirectly inform the MMC, e.g. by sending the information about the determined required minimum number of memory and related sizes directly to the MMC or by sending the information to one or more intermediate nodes or entities to be forwarded to the MMC.

The MMC may then initialise/manage the memory allocation by contacting the relevant memory pools (e.g. a memory manager unit associated with respective pool). and replies to the memory allocation manager with the location and physical addresses of each allocated block. As, the memory blocks are shared among many instances, the number of requested memory blocks by applications is much larger than the number demanded by memory allocation manager.

Figure 2B:
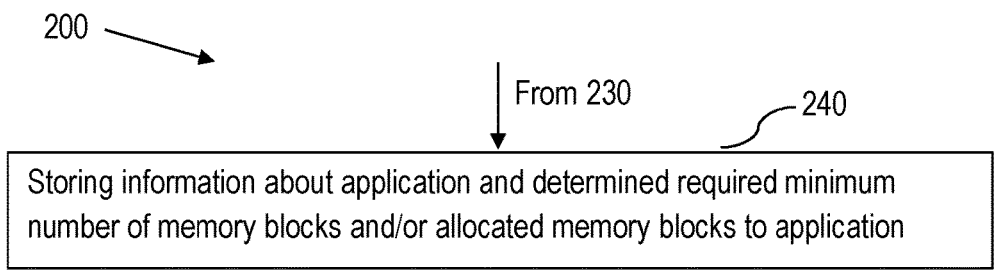
FIG. 2b is a flowchart of a method performed by a memory allocation manager for managing memory allocation, according to another exemplifying embodiment.

The method may further comprise, as illustrated in FIG. 2b, storing 240 information about the application and the determined required minimum number of memory blocks and/or the allocated memory blocks to the application.

By storing information about the application and the determined required minimum number of memory blocks and/or the allocated memory blocks to the application, the memory allocation manager may access this information at a later stage when the same application is to be initiated again.

As described above, the memory allocation manager may make use of such information when determining the required minimum number of memory blocks and associated sizes for the application.

The memory requirements may be at least associated with "write only", "read only" and "read and write" type and volume of memory.

Different memories may be associated with different capabilities and different requirements. For example, there are memory requirements that are "read only" which means that the instance only needs to read the content of the memory; "write only" which means that the instance only needs to write/store data in the memory without having to read it at a later time; and there are memory requirements that are "read and write" which means that the instance with such a memory requirement both needs to write/store data in the memory and also access the data (read the data) at a later time.

Reverting to the non-limiting, simplified and illustrative example above of an application having instances A, B, C, D and E, instance A has a memory requirement of "read and write", instance B has a memory requirement of "write only" and instances C, D and E have a memory requirement of "read only".

In an example, an instance requiring a write type of memory, wherein the instance is allowed to write information to the memory, is allocated a memory block of a size according to the received information associated with the plurality of instances associated with the application to be initiated.

In order to ascertain that instances requiring write type of memory are allocated enough and correct memory, such instances are allocated a memory block of a size according to the received information associated with the plurality of instances associated with the application to be initiated.

Reverting to the non-limiting, simplified and illustrative example above of an application having instances A, B, C, D and E, instance A may have a requirement for memory to write 1.5 Mbytes and instance B may have a requirement for memory to write 2 Mbytes. If so, then instance A is allocated memory block of at least 1.5 Mbytes in which instance A may write data; and instance B is allocated a memory block of at least 2 Mbytes in which instance B may write data.

In another example, one or more instances requiring to read content of memory block(s) associated with one or more instances requiring the write type of memory is allocated the same memory block(s) as the one or more instances requiring the write type of memory instead of a separate copy of that memory block or those memory blocks.

In order to not waste memory and to minimise the amount of memory to be allocated, the instances requiring to read data of from memories allocated to instances having write permission to their memory blocks may not be allocated separate memory blocks having copied content from the memory blocks allocated to instances having write permission to their memory blocks. Instead, they are allocated the same memory block(s) as the one or more instances requiring the write type of memory.

Once again, reverting to the non-limiting, simplified and illustrative example above of an application having instances A, B, C, D and E, instance A is allocated memory block of at least 1.5 Mbytes in which instance A may write data. However, since instance A also needs to read data of memory block allocated to instance B, i.e. a memory block of 2 Mbytes in which instance B may write data, instance A is also allocated the memory block of instance B instead of being allocated a further memory block having the same information copied from the memory block of instance B. Analogously, instance B is allocated memory block of at least 2 Mbytes in which instance B may write data. Since instance C needs to read the data of both the memory block of instance A and the memory block of instance B, instance C is allocated both memory blocks (with only read permission). Instance D requiring to read data of memory block of instance B is allocated the memory block of instance B. Instance E requiring to read data of memory block of instance A is allocated the memory block of instance A.

In yet another example, two or more instances requiring access to same content of memory block(s) have the same memory block(s) allocated to them instead of a separate copy of that memory block or those memory blocks.

By having the instances only requiring to read content of memory blocks of instances requiring to write data to the memory blocks, allocated to the memory blocks of instances requiring to write data to their memory blocks, much memory capacity may be saved.

For example in the above non-limiting, simplified and illustrative example, there is no need to duplicate the memory block of instance A twice (once for instance C and once for instance E thereby saving 2*1.5=3 Mbytes of memory) and there is no need to duplicate the memory block of instance B thrice (once for A, once for C and once for D thereby saving 3*2=6 Mbytes of memory).

However, in one example, the memory block of instance A may be duplicated once into a memory block being allocated to both instances C and E. There is still a big save in memory since not all individual instances are allocated their own separate copy of the memory block of instance A.

Likewise, the memory block of instance B may be duplicated once into a memory block being allocated to both instances A, C and D.

Embodiments will now be described with reference to FIGS. 3a-3g. The solutions disclosed herein provide a method and a memory allocation manager for enhancing performance of big data analysis algorithms by allocating same blocks of memory for instances with shared datasets, which may be considered as local memory for each instance or process. This allow to reduce the memory and networking transactions among computing resources during task execution as well as reducing the number of copies of the same data related to each application.

New data centre hardware architectures rely on the principle of hardware resource disaggregation. The hardware disaggregation principle considers CPU, memory and network resources as individual and modular components. These resources tend to be organised in a pool based way, i.e. there may be a pool of CPU units, a pool of memory units, and a pool of network interfaces. In this sense, a host (also known as a logical server or instance) is composed of a subset of units/resources within one or more pools.

For example, with respect to the memory pools in disaggregated architecture, each memory pool can serve multiple hosts (by providing dedicated memory units or memory blocks from the pool to each host), and a single host can eventually consume memory resources from multiple memory pools.

This new architecture makes it possible to have new ways of implementations for various applications leading to better efficiency and resource utilisation. In case of large scale data processing in distributed systems, normally there is huge amount of datasets which are shared among more than two (many) processing units. Moreover, there are "Big" data applications using large databases that use several iterations on the same dataset which may also benefits from this new data centre architecture.

The solution disclosed in this disclosure minimises the use of resources in terms of local memory, storage volumes, I/O and networking transaction as well as traffic load on the inter/intra data centre networking, for large scale data processing jobs/applications using disaggregated concept and architecture. Furthermore, the solution described herein may also reduce the delay of running tasks related to such jobs via bypassing the interactions with various memory levels and storage nodes.

A shared memory unit may be a part of Random Access memory, RAM, or any fast block of memory which is accessible by multiple hosts/processes/VMs/applications (also referred generically as instances).

A memory block replica: Based on the size of a job, e.g. associated with an application, and number of parallel tasks and processes involved at each arbitrary point in time, more than one block of shared memory might be created where all or a sub-set of their content is similar to each other's.

The solution disclosed herein comprises of an entity named as memory allocation manager, which is responsible for translating application requirements and instances graph to be understandable by MMC to allocate shared block of memory for instances/processes with common datasets. Shared memory blocks are chosen from a pool of memory (e.g. RAM, Non-volatile memory express: NVMe, etc.) which might be located in the same pool, or among several pools within a data centre. This shared memory is considered as the local memory block for each of the CPU associated with the instances, and the communication between CPUs and memory blocks may be done through a fast interconnect using variety of protocols, e.g. such as Peripheral Component Interconnect Express, Serial Advances Technology Attachment: SATA, Intel's QuickPath Interconnect, or any other suitable protocols.

FIG. 1a illustrates an example of a data centre comprising a disaggregated architecture. CPU pools (210-$x$), memory pools (220-$x$), Network Interface Card: NIC pools (230-$x$) and storage pools (240-$x$) are shared between hosts (250). Each pool can have none, one or more management units. For example, the CPU pool might comprise one or more MMU. The MMU is in charge of translating the memory address, and it is associated with the CPUs (either by being implemented as part of the CPU, or as a separate circuit). The memory pool may be associated with one or more MMCs, which are responsible for handling performance of the memory nodes (221-$x$). NIC pools (230-$x$) are used as the network interface for any of the components in the pools i.e. CPUs, memory, storage nodes that need external communication during their execution. Storage pools (240) may comprise a bunch of storage node for storing the resistant data of the users. A fast interconnect (204) connects the multiple resources.

Then there are different hosts, logical servers and/or processes that are responsible for running various applications comprising a plurality of instances on top of the aforementioned hardware layer (virtualisation layer might be used on top of hardware resources for separating the application and the hardware, but it is out of the scope of this disclosure).

Figures 3A, 3B:
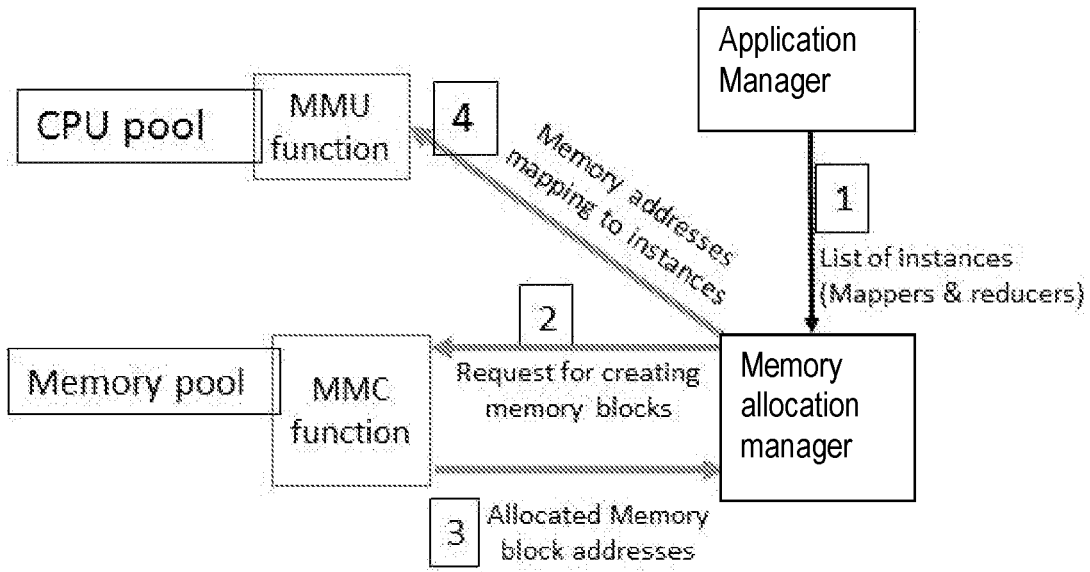
FIG. 3a is an illustration of an exemplifying structure of the solution disclosed herein.
FIG. 3b shows Table 1, which is an example of a request coming from an application manager.

FIG. 3a illustrates an exemplifying structure of the solution disclosed herein, which is mainly focused on the memory allocation manager responsible for handling memory sharing among instances of same application. The application manager is responsible for managing the incoming job, and completion of job in an acceptable time window. So, when a new job is received, the application manager may send a list of instances that should be initiated including the number and characteristics of the instances to complete the job to the memory allocation manager.

Then the memory allocation manager may build a graph of shared memory blocks based on the list of instances coming from applications, based on either its own prior knowledge of application, learning during the time, or information comprised in the list of instances about an internal relationship between the instances. The memory allocation manager communicates with MMC/s and MMU/s which are responsible for managing memory addresses and selecting suitable memory units among pool of available resources based on aggregated requirements.

Then the memory allocation manager may map the graph to memory block requirement(s) readable by the MMC, and send the aggregated requirements regarding the size and number of blocks that need to be allocated for the application and its instances to the MMC. Then the MMC may initialise/manage the memory allocation by contacting the relevant memory pools (e.g. the memory manager unit in each pool) and replies to the memory allocation manager with the location and physical addresses of each allocated block. As, the memory blocks are shared among many instances, the number of requested memory blocks by applications and their instances is much larger than the number demanded by the memory allocation manager.

At this point, the memory allocation manager may map the shared/allocated memory blocks to the instances asked by applications to be sent to MMU for creating the whole instance and updating memory addresses related to each instance.

The memory allocation manager acts as a thin layer (bridging entity) between application manager/scheduler and hardware layer management functions, where no major changes is required in the MMC, MMU and application.

The blocks of memory are write protected, and may be written in only by one instance at a time, but may be read by many instances. If the number of instances reading the same data/memory increases or some of the instances are far from the location of current shared block, the memory allocation manager may create a duplicated copy of desired memory block in some other location and update physical addresses of instances through MMU. As only one instance is allowed to write in a specified memory block, the data will be protected from overwriting, and since several instances reading from the same place there is no issue with synchronisation of data.

The solution disclosed herein thus provides a method and a memory allocation manager for better resource utilisation and lower latency especially in case of large-scale data processing applications with shared data-set or interactive operations using same dataset. In this context, the map-reduce functionality is one of the widely used in distributed systems for parallel processing of big data sets. Service chaining models could be as another widely used examples where instances use the data sets produced by some other instances in the chain. The solution disclosed herein will now be described considering its implementation in case of the map-reduce functionality. However, it may be used for any type of applications, algorithms, or use cases which use a set of data more than once or by more than two Instances.

When the application manager (or master node in case of map reduce) receives the job it calculates how much resources is needed (e.g. number of mappers and reducers defined with number of CPUs and amount of RAMs). Then it sends the estimated resources to the memory allocation manager to be allocated/initiated. The request may be something similar to what is shown in table 1 of FIG. 3*b*.

The memory allocation manager may aggregate the requested memory by estimating the minimum amount of memory blocks containing the shared resources (see table 2 of FIG. 3*c*). As the reducers all need to read the same intermediate data produced by the mappers, at least one block of shared memory whith read permission for reducers is enough (if the number of reducers is high or some reducers are located far from current copy of data, the readable block can be duplicated into more than one, but still less than the number of reducers).

The memory allocation manager may then send the content of table 2 to the MMC in order to allocate/instantiate requested blocks and return the physical addresses (see table 3 of FIG. 3*d*).

Then the memory allocation manager may map the instance request that came from application to the allocated memory blocks and send the information (table 4 of FIG. 3*e*) to MMU to allocate CPUs and instantiate the whole process. The MMC is also responsible for memory addresse translation for the CPUs to be able to execute the application.

Figure 3F:
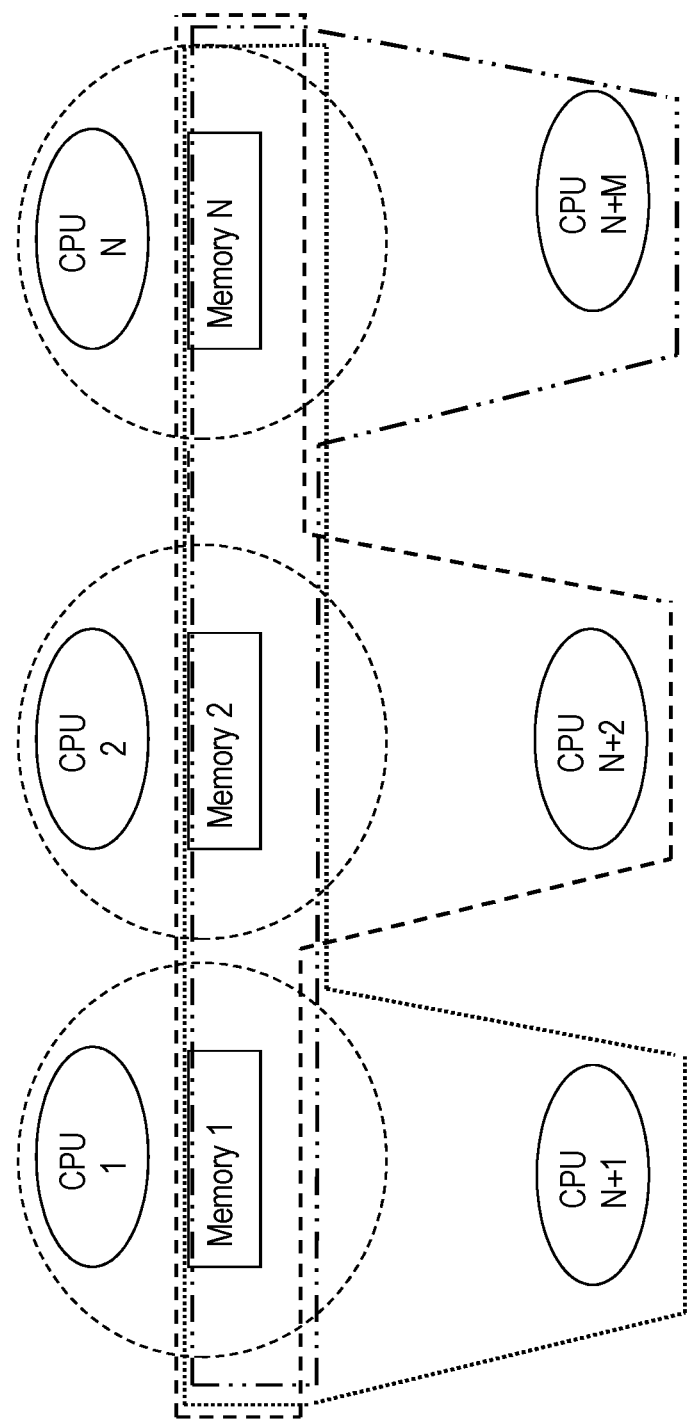
FIG. 3f is an illustration of an allocation in accordance with the example.

The instances resulted from such allocation is depicted in FIG. 3*f*, where CPU1, 2 and N (at the top of the figure) are related to Mappers, and the rest (at the bottom of the figure) are related to Reducers.

Figure 3G:
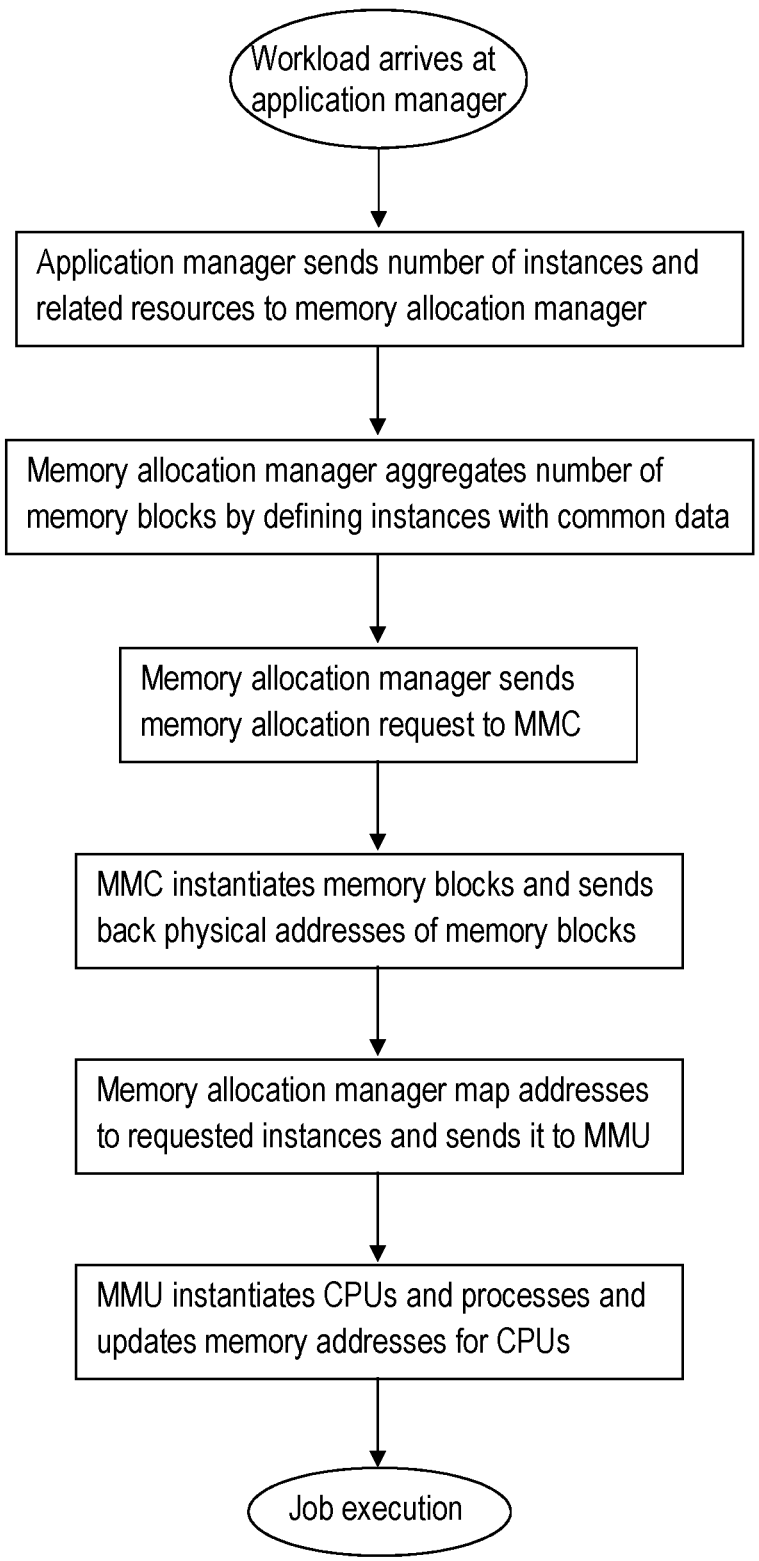
FIG. 3g is a flowchart of an exemplifying implementation in which steps executed by different entities are illustrated and thus not only steps performed by the memory allocation manager.

FIG. 3*g* is a flowchart of an exemplifying implementation in which steps executed by different entities are illustrated and thus not only steps performed by the memory allocation manager.

FIG. 3*g* illustrates in this example that the application manager receives a workload, also called a job, which is associated with a plurality of individual instances. The application manager sends a list with a number of instances and related resources to the memory allocation manager, which upon receipt aggregates the number of memory blocks by defining (or identifying) instances that share the same data. The memory allocation manager then sends a memory allocation request to the MMC based on the identified instances that share the same data. The MMC in turn instantiates memory blocks and returns physical addresses of the memory blocks to the memory allocation manager. The memory allocation manager may the map the physical addresses of the memory blocks to the instances on the list received from the application manager, and sends the result to the MMU. This enables the MMU to instantiate CPU processes and to update memory addresses for the CPU. Once this is performed, the job (e.g. an application) received at the application manager may start executing.

Embodiments herein also relate to a memory allocation manager for managing memory allocation, within a data centre, to an application. The data centre comprises at least one CPU pool and at least one memory pool. The memory allocation manager has the same technical features, objects and advantages as the method performed by the memory allocation manager described above. The memory allocation manager will only be described in brief in order to avoid unnecessary repetition. Exemplifying embodiments of such a memory allocation manager will now be described with reference to FIGS. 4 and 5.

Figure 4:
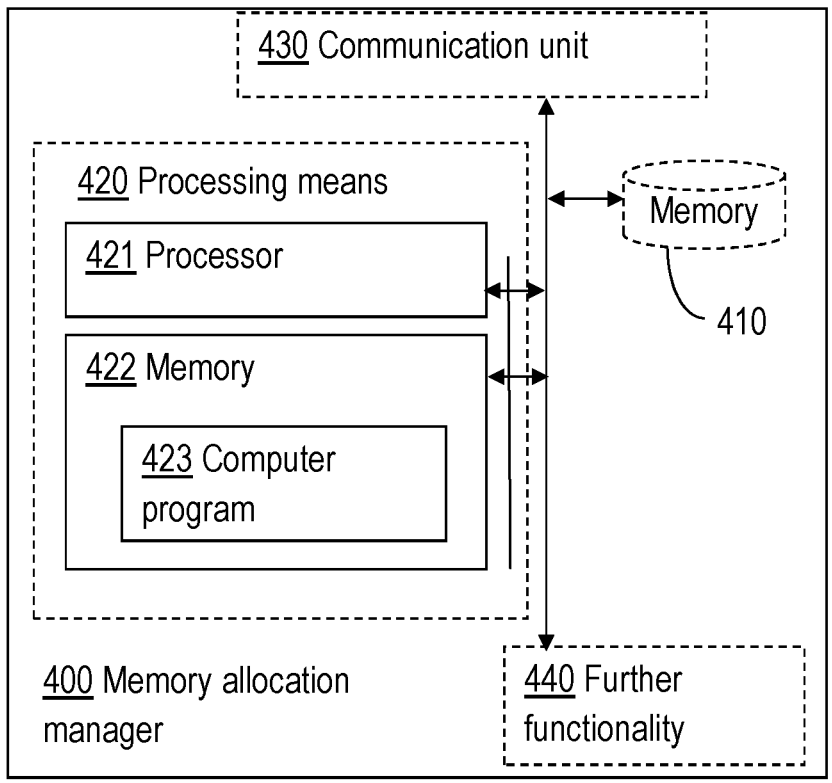
FIG. 4 is a block diagram of a memory allocation manager for managing memory allocation, according to an exemplifying embodiment.
Figure 5:
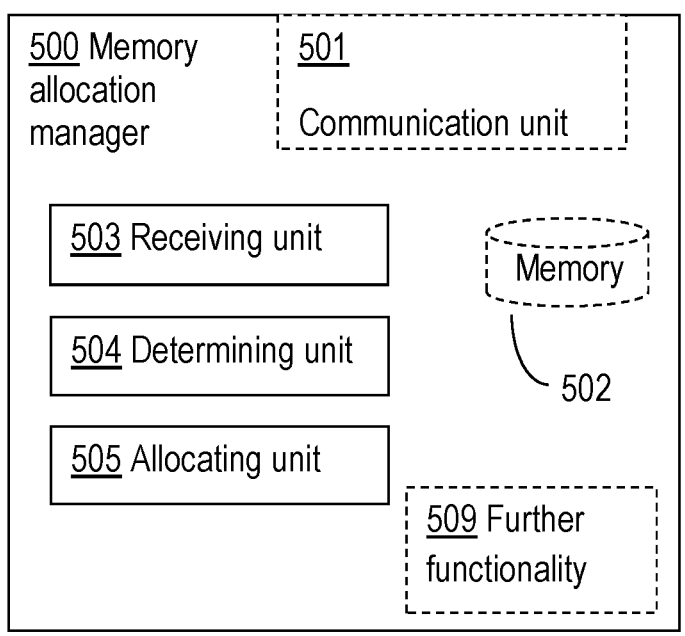
FIG. 5 is a block diagram of a memory allocation manager for managing memory allocation, according to another exemplifying embodiment.

FIGS. 4 and 5 illustrates the memory allocation manager 400, 500 being configured for receiving information associated with a plurality of instances associated with an application to be initiated, wherein individual instances are associated with individual memory requirements, the information further comprising information about an internal relationship between the instances; and determining for a plurality of instances, a minimum number of memory blocks and associated sizes required based on the received information, by identifying parts of memory blocks and associated sizes that may be shared by two or more instances based on their individual memory requirements and/or the internal relationship between the instances. The memory allocation manager 400, 500 is further configured for allocating a number of memory blocks to the instances of the application based on the determined minimum number of memory blocks.

The memory allocation manager 400, 500 may be implemented or realised in different ways. An exemplifying implementation is illustrated in FIG. 4. FIG. 4 illustrates the memory allocation manager 400 comprising a processor 421 and memory 422, the memory comprising instructions, e.g. by means of a computer program 423, which when executed by the processor 421 causes the memory allocation manager 400 to receive information associated with a plurality of instances associated with an application to be initiated, wherein individual instances are associated with individual memory requirements, the information further comprising information about an internal relationship between the instances; and to determine for a plurality of instances, a minimum number of memory blocks and associated sizes required based on the received information, by identifying parts of memory blocks and associated sizes that may be shared by two or more instances based on their individual memory requirements and/or the internal relationship between the instances. The memory 422 further comprises instructions, e.g. by means of a computer program 423, which when executed by the processor 421 causes the memory allocation manager 400 to allocate a number of memory blocks to the instances of the application based on the determined minimum number of memory blocks.

FIG. 4 also illustrates the memory allocation manager 400 comprising a memory 410. It shall be pointed out that FIG. 4 is merely an exemplifying illustration and memory 410 may optionally, be a part of the memory 422 or be a further memory of the memory allocation manager 400 operable in the data centre. The memory may for example comprise information relating to the memory allocation manager 400, to statistics of operation of the memory allocation manager 400, just to give a couple of illustrating examples. FIG. 4 further illustrates the memory allocation manager 400 comprising processing means 420, which comprises the memory 422 and the processor 421. Still further, FIG. 4 illustrates the memory allocation manager 400 comprising a communication unit 430. The communication unit 430 may comprise an interface through which the memory allocation manager 400 communicates with resources, arrangements or entities of the data centre. FIG. 4 also illustrates the memory allocation manager 400 comprising further functionality 440. The further functionality 440 may comprise hardware of software necessary for the memory allocation manager 400 to perform different tasks that are not disclosed herein.

An alternative exemplifying implementation of the memory allocation manager 400, 500 is illustrated in FIG. 5. FIG. 5 illustrates the memory allocation manager 500 comprising a receiving unit 503 for receiving information associated with a plurality of instances associated with an application to be initiated, wherein individual instances are associated with individual memory requirements, the information further comprising information about an internal relationship between the instances; and an determining unit 504 for determining for a plurality of instances, a minimum number of memory blocks and associated sizes required based on the received information, by identifying parts of memory blocks and associated sizes that may be shared by two or more instances based on their individual memory requirements and/or the internal relationship between the instances. FIG. 5 also illustrates the memory allocation manager 500 comprising an allocating unit 505 for allocating a number of memory blocks to the instances of the application based on the determined minimum number of memory blocks.

In FIG. 5, the memory allocation manager 500 is also illustrated comprising a communication unit 501. Through this unit, the memory allocation manager 500 is adapted to communicate with other arrangements and/or entities in the data centre. The memory allocation manager 500 may further comprise a non-volatile memory 502 for storing data. Further, the memory allocation manager 500 may comprise a control or processing unit (not shown) which in turn is connected to the different units 503-505. It shall be pointed out that this is merely an illustrative example and the memory allocation manager 500 may comprise more, less or other units or modules which execute the functions of the memory allocation manager 500 in the same manner as the units illustrated in FIG. 5.

It should be noted that FIG. 5 merely illustrates various functional units in the memory allocation manager 500 in a logical sense. The functions in practice may be implemented using any suitable software and hardware means/circuits etc. Thus, the embodiments are generally not limited to the shown structures of the memory allocation manager 500 and the functional units. Hence, the previously described exemplary embodiments may be realised in many ways. For example, one embodiment includes a computer-readable medium having instructions stored thereon that are executable by the control or processing unit for executing the method steps in, or performed by, the memory allocation manager 500. The instructions executable by the computing system and stored on the computer-readable medium perform the method steps of the memory allocation manager 500 as set forth in the claims.

The memory allocation manager has the same possible advantages as the method performed by the memory allocation manager. One possible advantage is that the use of memory resources in new data centre environments may be reduced by creating less copy of the same data. Another possible advantage is that networking transactions may be reduced, which leads to less traffic on the inter-/intra-data centre networks. Yet a possible advantage is that latency may be reduced by accessing data directly from shared RAM instead of retrieving it from storage node reside somewhere in the network with limited speed and capacity. Still a possible advantage is that job performance may be improved and the job execution time may be speeded up, meaning that more tasks may be executed with less amounts of resources and in shorter time.

According to an embodiment, the received information associated with a plurality of instances further comprises information about type of application, wherein the memory allocation manager 400, 500 is configured for determining the required minimum number of memory blocks and associated sizes further based on the known relation between instances for that type of application.

According to still an embodiment, the memory allocation manager 400, 500 is further configured for determining the required minimum number of memory blocks and associated sizes based on previous knowledge about the application.

According to yet an embodiment, the memory allocation manager 400, 500 is further configured for allocating required memory to the instances of the application by informing the determined required minimum number of memory blocks and related sizes to an MMC and receiving an allocation of memory blocks with addresses among at least a pool of memory units to the required minimum number of memory blocks.

According to another embodiment, the memory allocation manager 400, 500 is further configured for storing information about the application and the determined required minimum number of memory blocks and/or the allocated memory blocks to the application.

According to a further embodiment, the memory requirements are at least associated with "write only", "read only" and "read and write" type and volume of memory.

According to still an embodiment, an instance requiring a write type of memory, wherein the instance is allowed to write information to the memory, is allocated a memory block of a size at least according to the received information associated with the plurality of instances associated with the application to be initiated.

According to yet an embodiment, one or more instances requiring to read content of memory block(s) associated with one or more instances requiring the write type of memory is allocated the same memory block(s) as the one or more instances requiring the write type of memory instead of a separate copy of that memory block or those memory blocks.

According to another embodiment, two or more instances requiring access to same content of memory block(s) have the same memory block(s) allocated to them instead of a separate copy of that memory block or those memory blocks.

Figure 6:
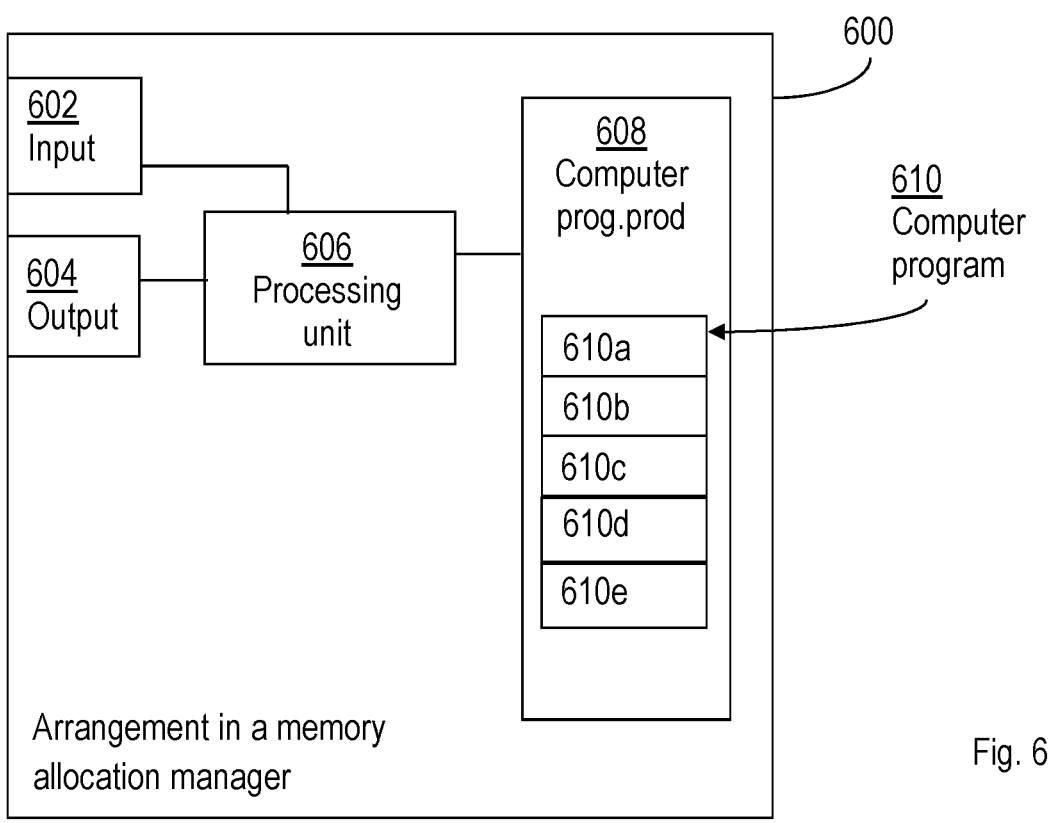
FIG. 6 is a block diagram of an arrangement in a memory allocation manager for managing memory allocation, according to an exemplifying embodiment.

FIG. 6 schematically shows an embodiment of an arrangement 600 in a memory allocation manager 500 operable in a data centre. Comprised in the arrangement 600 in the memory allocation manager 500 are here a processing unit 606, e.g. with a DSP. The processing unit 606 may be a single unit or a plurality of units to perform different actions of procedures described herein. The arrangement 600 in the memory allocation manager 500 may also comprise an input unit 602 for receiving signals from other entities or arrangements, and an output unit 604 for providing signal(s) to other entities or arrangements. The input unit and the output unit may be arranged as an integrated entity or as illustrated in the example of FIG. 5, as one or more interfaces 501.

Furthermore, the arrangement 600 in the memory allocation manager 500 comprises at least one computer program product 608 in the form of a non-volatile memory, e.g. an EEPROM, a flash memory and a hard drive. The computer program product 608 comprises a computer program 610, which comprises code means, which when executed in the processing unit 606 in the arrangement 600 in the memory allocation manager 500 data centre causes the memory allocation manager 500 to perform the actions e.g. of the procedure described earlier in conjunction with FIGS. 2a and 2b.

The computer program 610 may be configured as a computer program code structured in computer program modules 610a-610e. Hence, in an exemplifying embodiment, the code means in the computer program of the arrangement 600 in the memory allocation manager 500 comprises a receiving unit, or module, for receiving information associated with a plurality of instances associated with an application to be initiated, wherein individual instances are associated with individual memory requirements, the information further comprising information about an internal relationship between the instances; and a determining unit, or module, for determining for a plurality of instances, a minimum number of memory blocks and associated sizes required based on the received information, by identifying parts of memory blocks and associated sizes that may be shared by two or more instances based on their individual memory requirements and/or the internal relationship between the instances. The computer program further comprises an allocating unit, or module, for allocating a number of memory blocks to the instances of the application based on the determined minimum number of memory blocks.

The computer program modules could essentially perform the actions of the flow illustrated in FIGS. 2a and 2b, to emulate the memory allocation manager 500 in the data centre. In other words, when the different computer program modules are executed in the processing unit 606, they may correspond to the units 503-505 of FIG. 5.

Although the code means in the respective embodiments disclosed above in conjunction with FIG. 5 is implemented as computer program modules which when executed in the processing unit causes the memory allocation manager to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the memory allocation manager.

It is to be understood that the choice of interacting units, as well as the naming of the units within this disclosure are only for exemplifying purpose, and nodes suitable to execute any of the embodiments of the methods described above may be configured in a plurality of alternative ways in order to be able to execute the suggested procedure actions.

It should also be noted that the units described in this disclosure are to be regarded as logical entities and not with necessity as separate physical entities. While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a memory allocation manager for managing memory allocation, within a data centre, to an application, the data centre comprising at least a Central Processing Unit, CPU, pool and at least one memory pool, the method comprising:

receiving information comprising a list of with a plurality of instances of an application to be initiated, wherein each instance to be initiated is associated with an individual memory requirement, the information further comprising information about a type or a version of the application to be initiated and information about an internal relationship between the plurality of instances to be initiated, determining for the list of the plurality of instances of the application to be initiated, a minimum number of memory blocks and associated sizes required based on the received information, by identifying at least a portion of the memory blocks and associated sizes to be shared by two or more instances based on their individual memory requirements and/or the internal relationship between the plurality of instances of the application to be initiated, transmitting, to a Memory Management Controller, MMC, information indicating the determined minimum number of memory blocks and associated sizes required to initiate the list of instances to be initiated, receiving, from the MMC, a location and a physical address of each allocation of memory blocks based on the determined minimum number of memory blocks and associated sizes required to initiate the list of instances, and wherein each memory block is associated with the physical address for at least one memory unit among a pool of memory units;

receiving, from the MMC, an allocation of a number of memory blocks for shared access, the number of memory blocks including the minimum number of memory blocks for the list of instances of the application to be initiated based on the determined minimum number of memory blocks, mapping the allocation of the number of memory blocks for shared access to the list of instances of the application to be initiated, wherein the number of memory blocks allocated for shared access comprises parts of memory blocks to be shared by the two or more instances of the application to be initiated, wherein a first of the two or more instances has write access and a second of the two or more instances has read access at a point in time, and transmitting the mapping of the allocation of the number of memory blocks for shared access to the list of instances of the application to be initiated to a MMU function in the CPU pool for instantiation of the list of instances of the application.

2. The method according to claim 1, wherein the determining of the required minimum number of memory blocks and associated sizes is further based on the internal relationship between instances for that type of application.

3. The method according to claim 1, wherein the determining of the required minimum number of memory blocks and associated sizes is further based on previous knowledge about the application.

4. The method according to claim 1, further comprising storing information about the application and the determined required minimum number of memory blocks and/or the allocated memory blocks to the application.

5. The method according to claim 1, wherein the individual memory requirements are at least associated with "write only", "read only" and "read and write" type and volume of memory.

6. The method according to claim 5, wherein the first instance requires the write only type of memory and writes information to the number of memory blocks.

7. The method according to claim 5, wherein the second instance requires the read only type of memory and reads the same number of memory blocks as the first instance requiring the write only type of memory instead of reading a separate copy of those memory blocks.

8. The method according to claim 1, wherein the two or more instances require access to the same parts of allocated memory blocks instead of a separate copy of those parts of memory blocks.

9. A computer program product comprising a computer program comprising computer readable code that, when executed by a processor, is operable to perform the method of claim 1.

10. A memory allocation manager for managing memory allocation, within a data centre, to an application, the data centre comprising at least a Central Processing Unit, CPU, pool and at least one memory pool, the allocation manager being configured for:

receiving information comprising a list of a plurality of instances of an application to be initiated, wherein each instance to be initiated is associated with an individual memory requirement, the information further comprising information about a type or a version of the application to be initiated and information about an internal relationship between the plurality of instances to be initiated, determining for the list of the plurality of instances of the application to be initiated, a minimum number of memory blocks and associated sizes required based on the received information, by identifying at least a portion of the memory blocks and associated sizes to be shared by two or more instances based on their individual memory requirements and/or the internal relationship between the plurality of instances of the application to be initiated, transmitting, to a Memory Management Controller, MMC, information indicating the determined minimum number of memory blocks and associated sizes required to initiate the list of instances to be initiated, receiving, from the MMC, a location and a physical address of each allocation of memory blocks based on the determined minimum number of memory blocks and associated sizes required to initiate the list of instances, and wherein each memory block is associated with the physical address for at least one memory unit among a pool of memory units;

receiving, from the MMC, an allocation of a number of memory blocks for shared access, the number of memory blocks including the minimum number of memory blocks for the list of instances of the application to be initiated based on the determined minimum number of memory blocks, mapping the allocation of the number of memory blocks for shared access to the list of instances of the application to be initiated, wherein the number of memory blocks allocated for shared access comprises parts of memory blocks to be shared by the two or more instances of the application to be initiated, wherein a first of the two or more instances has write access and a second of the two or more instances has read access at a point in time, and transmitting the mapping of the allocation of the number of memory blocks for shared access to the list of instances of the application to be initiated to a MMU function in the CPU pool for instantiation of the list of instances of the application.

11. The memory allocation manager according to claim 10, wherein the memory allocation manager is configured for determining the required minimum number of memory blocks and associated sizes further based on the internal relationship between instances for that type of application.

12. The memory allocation manager according to claim 10, further being configured for determining the required minimum number of memory blocks and associated sizes based on previous knowledge about the application.

13. The memory allocation manager according to claim 10, further being configured for storing information about the application and the determined required minimum number of memory blocks and/or the allocated memory blocks to the application.

14. The memory allocation manager according to claim 10, wherein the individual memory requirements are at least associated with "write only", "read only" and "read and write" type and volume of memory.

15. The memory allocation manager according to claim 14, wherein the first instance requires the write only type of memory and writes information to the number of memory blocks.

16. The memory allocation manager according to claim 14, wherein the second instance requires the read only type of memory and reads the same number of memory blocks as the first instance requiring the write only type of memory instead of reading a separate copy of those memory blocks.

17. The memory allocation manager according to claim 10, wherein the two or more instances require access to the same parts of allocated memory blocks instead of a separate copy of those parts of memory blocks.

* * * * *